United States Patent Office 2,813,072
Patented Nov. 12, 1957

2,813,072

PROCESS FOR PREPARING THERMO-SETTING RESINS

Ladislao J. Biro, Buenos Aires, Argentina

No Drawing. Application January 7, 1955,
Serial No. 480,599

6 Claims. (Cl. 204—158)

The present invention refers to a process for preparing thermosetting resins and more particularly to a material conditioned for molding.

This application is a continuation-in-part of my copending application Serial Number 358,550, filed on May 29, 1953.

As is known, the production of molding powder based on synthetic phenolic resin, is divided into three fundamental steps, which are classified as "A," "B" and "C."

The first thereof, i. e. "A" which is the first condensation is soluble alcohol or other solvents, is a material which is fusible by heat but which hardens with the cold.

Generally, material "A," presented in powder form, is mixed with the loading materials by means of heated calenders; with this is obtained the transformation of the resin to the "B" state, which resin is not soluble in any solvent, but fusible to heat.

The "B" state which is that of the commercial molding powder. The latter in a hot press assumes the form of its container, and then passes to the "C" state, the resin then being insoluble and infusible.

In the preparation of this common material, which can be classified as the "Bakelite" type, the process is very slow, particularly in the step considered essential, which is that of polymerization, as the condensation cannot be spontaneous but provoked by the heating treatment.

With the object of simplifying the preparation of the plastic material, tests have been made with different accelerating means until the treatment was reached which could be considered as ideal. The material is conditioned in such a manner that in the molding itself the steps "B" and "C" are effected.

This treatment, which is the basis of the present invention, is the product of a special actinism based on the irradiation of infrared rays which directly provokes, between the basic components, a condensation reaction.

To this end, taking as basis a mixture of an aldehyde and a substance of the monohydric phenol group, a gel is formed, and thus gellified, the binary compound is submitted to a condensation process by actinism which, being of the infrared ray scale, is carried out in a very short time, producing a product in the "A" state in which may be incorporated the current loading materials for the final molding.

This product in the "A" state, with a certain degree of polymerization, acquires special characteristics, as it is soluble in alcohol and somewhat in acetone. It is liquified by heat and solidified by cold at an ambient temperature, acquiring a consistence similar to that of crude rubber.

Reduced to powder or scales, the material is applied for molding as any other of its kind, as in the hot press it rapidly melts, reaching "B" and "C" states; that is to say that it is converted in a hard, insoluble, infusible, and heat resisting material, maintaining the form acquired in the mold.

In the laboratory tests it has been proved that sodium silicate or other sodium components are not indispensable for the production of the gel constituting the pre-conditioning for the condensation treatment by actinism. In effect, in order to gellify the binary compound based on aldehydes and monohydric phenols, other gel-forming alkalizing substances may be employed, which may even be neutral or slightly acidic, provided that in the process the pH varies in progress, that is, towards the alkalinity.

For instance the silicate of ammonia, according to tests, has proved to be a good gel-forming product; as in the heating of said process, the ammonia is eliminated by evaporation, the silicate remaining, with the consequent increase of pH, which gives rise to a gellification, sufficient to support the molecules of the compound.

A possible theory of the process may be explained in the following manner: the gel constitutes the support of the molecules of the basic mixture, assisting in the regulation of the molecules for their treatment. The infrared rays, as they are directly projected in said compound, act actinically causing the molecules to move in such a manner that they form chains acquiring plastic characteristic.

The action of the infrared rays is so rapid as condensing reactor that they save a great deal of time as well as power; as what generally requires a great number of hours, is then effected in minutes with great advantage, even in the conditioning of the material itself as a molding product.

For a greater clearness and comprehension of the object of this invention there are detailed some examples of execution in accordance with laboratory essays.

*Example I*

A mixture is prepared with an aldehyde, for example, a formaldehyde aqueous solution at 40%, in a proportion of 47%, and a substance of the monohydric-phenol group, for example phenol, in a proportion of 53%.

This binary composition is alkalized through the incorporation of sodium silicate in an aqueous solution at 60° Baumé; the proportion of this solution in respect to the binary mixture being of 12%, so that it may be capable of forming a gel.

The gellification is obtained by pouring the binary compound into the stirred sodium silicate, after which is obtained the suspension of the molecules of said basic compound.

After this preparation a condensation is provoked between the phenol and formol through actinism, treating the mixture with the projection of infrared rays in a degree capable of provoking an exothermic reaction.

Through this means a product in the "A" state is obtained which when heated can be mixed with the usual loading materials so that powdered or in scales, said product is suitable for the molding industry.

As has been stated, when melting the product in the hot press within the mold, an insoluble and heat resistant plastic is obtained which acquired the shape of the mold.

*Example II*

A mixture composed of 50 parts of formol, 30 of phenol, 20 parts of cresol.

Said mixture is suspended in a gel formed with the incorporation of sodium silicate in a 60° Baumé solution. Said gel-forming material is applied in a proportion of 12% in respect to the basic mixture, obtaining an arrangement and regulation of the molecules.

In this state the compound is treated by actinism, projecting infrared rays with the necessary intensity in order to produce a condensation giving rise to the formation of polymerization chains; all of which without passing through the "A" state or stage, so that, with the corresponding loading materials only when in the hot mold the "C" stage is obtained which product is insoluble and heat resistant.

Similar effects are obtained with the gellification based on alkaline aluminate, alkaline zincate, and alkaline silicate.

*Example III*

A mixture is prepared with 50 parts of formol and 50 parts of phenol; this mixture is incorporated into silicate of ammonia this being in a proportion of 15% in respect to the phenol-formol mixture forming a gel.

At a temperature of 60 degrees the ammonia is evaporated, alkalinizing the gel.

After setting during 60 minutes the compound suspended in the gel is treated by actinism, projecting thereon in direct manner as infrared radiation able to provoke an exothermic reaction with the consequent coagulation or condensation in which the chains formed obtain the character of polymerization.

This product in the "A" state is mixed with the usual loading materials and reduced to a powder or scale state, remains with a molding material quality.

Undoubtedly when carrying out this invention, modifications may be introduced in what refers to the quantity of component substances; furthermore, other aldehydes or other substances of the monohydric phenol group may be employed for the forming of the basic composition; on the other hand, other alkalinizers or gellificants may be employed for conditioning the basic mixture; but providing that when the condensation process be provoked by actinism through infrared rays directly irradiated against the referred basic mixtures; all of which is clearly specified in the following claims.

I claim:

1. The method comprising shortening the time of condensation necessary to produce a monohydric phenol formaldehyde thermosetting resin comprising forming a gel from an aqueous mixture including a monohydric phenol selected from the group consisting of phenol and cresol, formaldehyde and a gel-forming material, said gel-forming material being present in an amount equivalent to between 5 and 15% by weight based on the weight of the phenol and the formaldehyde, and prior to any condensation of said phenol with said formaldehyde, exothermically condensing said phenol and said formaldehyde only to the "A" stage by subjecting said gel to the action of infra-red rays, incorporating in the resulting "A" stage resin loading material and molding and further condensing the "A" stage resin through the "B" and "C" stages.

2. The method defined in claim 1 in which the gel forming material is selected from the group consisting of an alkaline silicate, an alkaline aluminate, and an alkaline zincate.

3. The method defined in claim 1 in which the gel-forming material is an alkaline silicate.

4. The method defined in claim 1 in which the gel-forming agent is an alkaline aluminate.

5. The method defined in claim 1 in which the gel-forming material is an alkaline zincate.

6. The method defined in claim 1 in which the gel-forming material is ammonium silicate.

References Cited in the file of this patent

UNITED STATES PATENTS 2,224,815     Glycofrides     Dec. 10, 1940

OTHER REFERENCES

Chem. Abstracts, vol. 27 (1933), p. 1719.
Chem. Abstracts, vol. 40 (1946), pp. 7693–4.